United States Patent
El Hajj et al.

(10) Patent No.: US 10,592,431 B2
(45) Date of Patent: Mar. 17, 2020

(54) INDEPENDENT SHARED AND PROCESS VIRTUAL ADDRESS TRANSLATIONS

(71) Applicant: HEWLETT PACKARD ENTERPRISE DEVELOPMENT LP, Houston, TX (US)

(72) Inventors: Izzat El Hajj, Urbana, IL (US); Alexander Marshall Merritt, Palo Alto, CA (US); Gerd Zellweger, Zurich (CH); Dejan S. Milojicic, Palo Alto, CA (US); Paolo Faraboschi, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/101,997

(22) Filed: Aug. 13, 2018

(65) Prior Publication Data
US 2020/0050553 A1    Feb. 13, 2020

(51) Int. Cl.
*G06F 12/00*    (2006.01)
*G06F 12/109*    (2016.01)
*G06F 12/1009*    (2016.01)

(52) U.S. Cl.
CPC ........ *G06F 12/109* (2013.01); *G06F 12/1009* (2013.01); *G06F 2212/656* (2013.01); *G06F 2212/657* (2013.01)

(58) Field of Classification Search
CPC ............ G06F 12/0284; G06F 12/1483; G06F 12/1027; G06F 9/45558; G06F 9/544
See application file for complete search history.

(56) References Cited

U.S. PATENT DOCUMENTS

| | | | |
|---|---|---|---|
| 6,549,996 B1 | 4/2003 | Manry, IV et al. | |
| 9,086,989 B2 * | 7/2015 | Gupta | G06F 12/1483 |
| 9,229,875 B2 | 1/2016 | Kim et al. | |
| 2002/0082823 A1 * | 6/2002 | Traut | G06F 9/45558 703/27 |
| 2008/0140971 A1 * | 6/2008 | Dankel | G06F 12/0284 711/163 |
| 2009/0320042 A1 * | 12/2009 | Thelen | G06F 9/544 719/312 |
| 2012/0117301 A1 * | 5/2012 | Wingard | G06F 12/1027 711/6 |
| 2016/0041923 A1 | 2/2016 | Wu | |

OTHER PUBLICATIONS

CSAPP; "Virtual Memory" Chapter 9, pp. 741-755; printed Mar. 21, 2018 from: http://csapp.cs.cmu.edu/2e/ch9-preview.pdf.

* cited by examiner

*Primary Examiner* — Ryan Bertram
*Assistant Examiner* — Trang K Ta
(74) *Attorney, Agent, or Firm* — Mannava & Kang, P.C.

(57) ABSTRACT

According to examples, an apparatus may include a processor to address a physical memory having memory sections, in which a first set of memory sections may be shared between processes and a second set of memory sections may be specific to an individual process. The apparatus may also include a shared virtual address space register to provide translation for the first set of memory sections shared between processes and a process virtual address space register to provide translation for the second set of memory sections specific to the individual process. The translation for the second set of memory sections may be independent from the translation for the first set of memory sections.

17 Claims, 7 Drawing Sheets

INDEPENDENT SHARED AND PROCESS VIRTUAL ADDRESS TRANSLATIONS

BACKGROUND

Computing systems may include a virtual memory system. In a virtual memory system computing device, each process is provided a virtual address space (VAS) that spans the entire address space addressable by the architecture of the processor (e.g., a 32 bit processor has a 4 Gigabyte address space), although not all of that address space may be directly accessible by the process due to other constraints. For example, certain address ranges within the VAS may be reserved for system functions (e.g., kernel space). In some cases, the virtual memory system may not implement the maximum address space supported by the processor (e.g., the virtual memory system may only support 30 address bits, limiting the VAS to 1 Gigabyte).

The address space for each process may be virtual because the computing system may not include enough physical memory for every processes' address space to be loaded into physical memory at the same time. The virtual memory system hides the fact that each processes' address space may not actually be loaded into the physical memory of the computing system by transparently swapping pages of each processes' address space between physical memory and some other storage (e.g., a swap file on disk).

BRIEF DESCRIPTION OF THE DRAWINGS

Features of the present disclosure are illustrated by way of example and not limited in the following figure(s), in which like numerals indicate like elements, in which.

DETAILED DESCRIPTION

Figure 1:
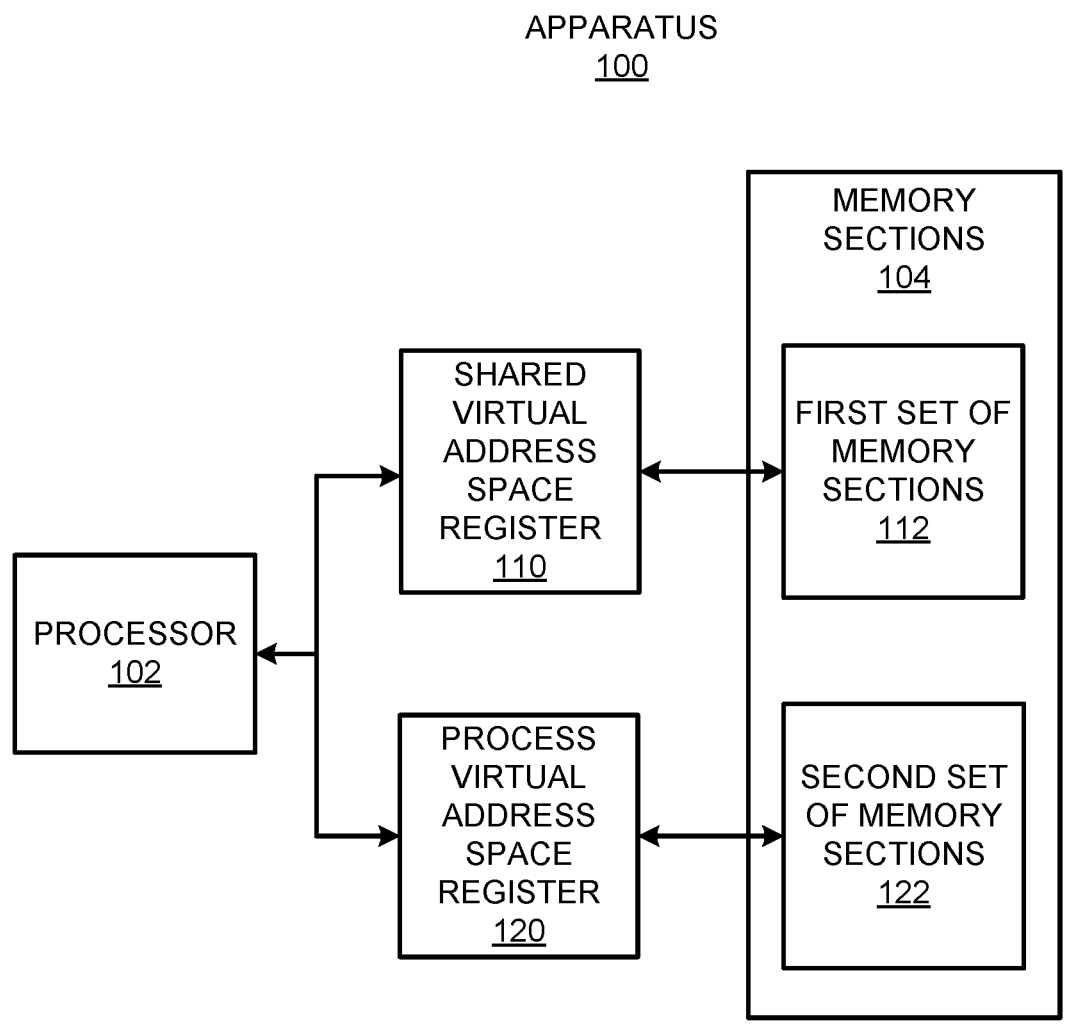
FIG. 1 shows a block diagram of an example apparatus that may provide architectural support for programming with multiple virtual address spaces per process.

A computing device employing a virtual memory system may allow a process to include a virtual address space (VAS) that exceeds the amount of physical memory in the computing device. However, computing devices are currently being developed with larger amounts of physical memory, and in some cases, the amount of physical memory may exceed that which is available in the VAS. As an example, a system supporting a 32 bit VAS defines the maximum address range as 4 Gigabytes. Physical memory exceeding 4 Gigabytes would not be addressable at any given moment in time by a process running on a computing device with such a VAS, regardless of how much physical memory was actually installed in the device. In addition, performance loss may arise from aggressive flushing of a translation lookaside buffer (TLB) by the hardware when address spaces are switched, as cached virtual to physical translations are invalidated, which may require repeated page walking. The switching of address spaces may also result in redundant translations being stored in the TLB, which may consume unnecessary space in the TLB.

Disclosed herein are apparatuses, methods, and non-transitory computer readable media that may provide architectural support to make programming with multiple virtual address spaces (VASes) per process efficient. In addition, the apparatuses, methods, and non-transitory computer readable media disclosed herein may enable enhancements to the translation hardware in processors to make caching and translation mechanisms more stateful of address space manipulation by software. Particularly, for instance, the apparatuses, methods, and non-transitory computer readable media disclosed herein may separately translate process-specific memory and shared memory regions, and may distinguish such translations in the translation caches.

According to examples, the apparatuses disclosed herein may include a processor to address a physical memory having memory sections, in which a first set of memory sections is shared between processes and a second set of memory sections is specific to an individual process. The apparatuses may also include a shared VAS register to provide translation for the first set of memory sections shared between processes and a process VAS register to provide translation for the second set of memory sections specific to the individual process. In addition, the translation for the second set of memory sections may be independent from the translation for the first set of memory sections. The memory sections may be memory segments or other units of a memory.

Through implementation of the apparatuses, methods, and computer readable media discussed herein, the memory sections that are specific to a process may be independent, e.g., may be decoupled, from the memory sections that may be shared between multiple processes. That is, the memory sections may be decoupled from each other through use of the shared VAS register and the process VAS register as disclosed herein. In one regard, process-specific memory and shared memory sections may be translated separately and such translations may be distinguished in translation caches. As a result, TLB support may be included to avoid storing translations to the same physical page redundantly and architecture support may be provided to allow users to switch VASes in user space without a system call overhead. In addition, the translation caches, e.g., the translation lookaside buffer (TLB), may be flushed less frequently, as may be performed when VASes are switched as cached virtual to physical translations are invalidated, which may require repeated page walking. This may improve performance as losses arising from aggressive flushing of the TLB by hardware may be reduced.

Before continuing further, it should be understood that the terms "a" and "an" are intended to denote at least one of a particular element. As used herein, the term "includes" means includes but not limited to, the term "including"

means including but not limited to. The term "based on" means based at least in part on.

Figure 2A:
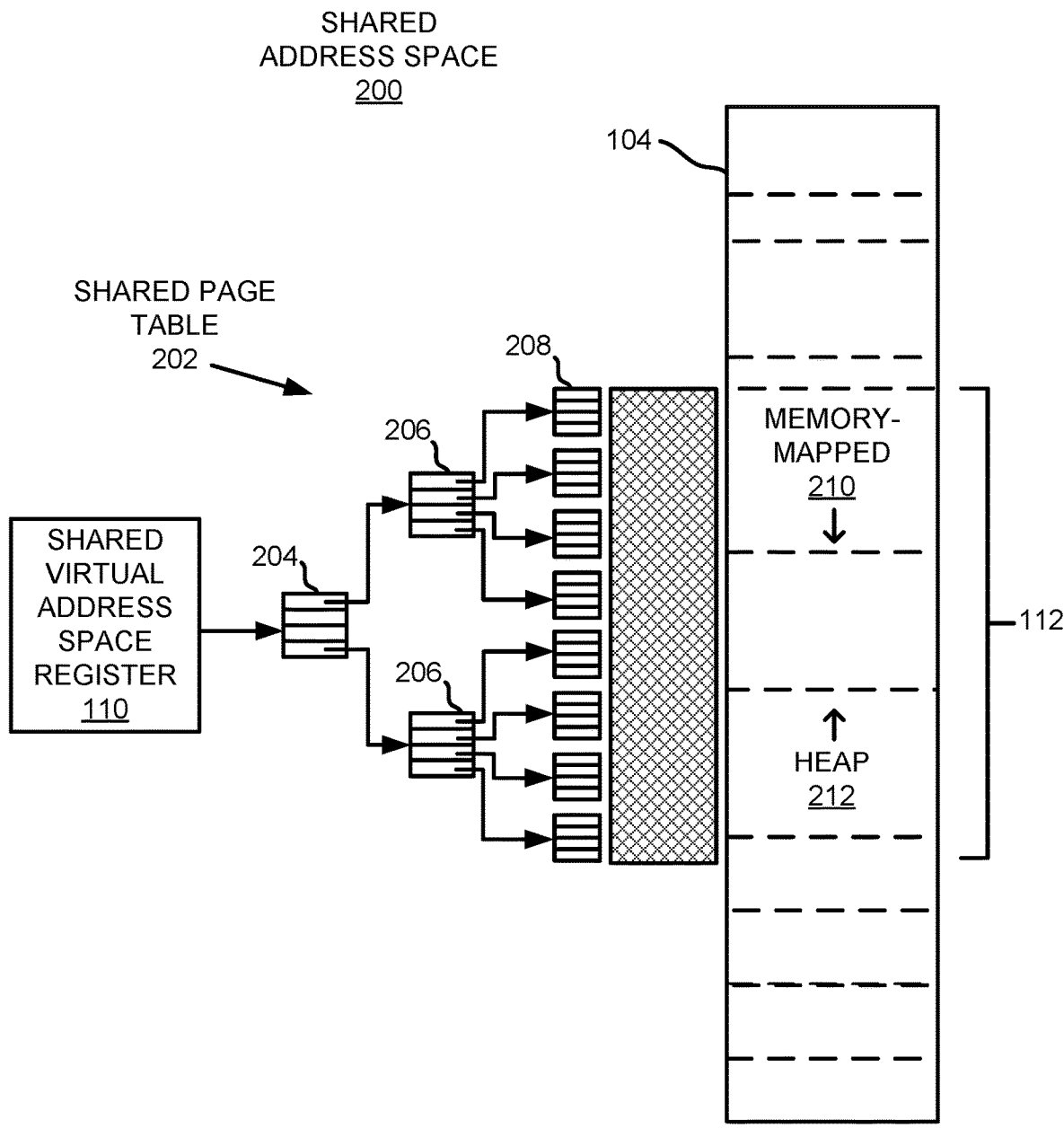
FIG. 2A depicts a block diagram of a shared address space that may include the shared VAS register and the first set of memory sections depicted in FIG. 1.
Figure 2B:
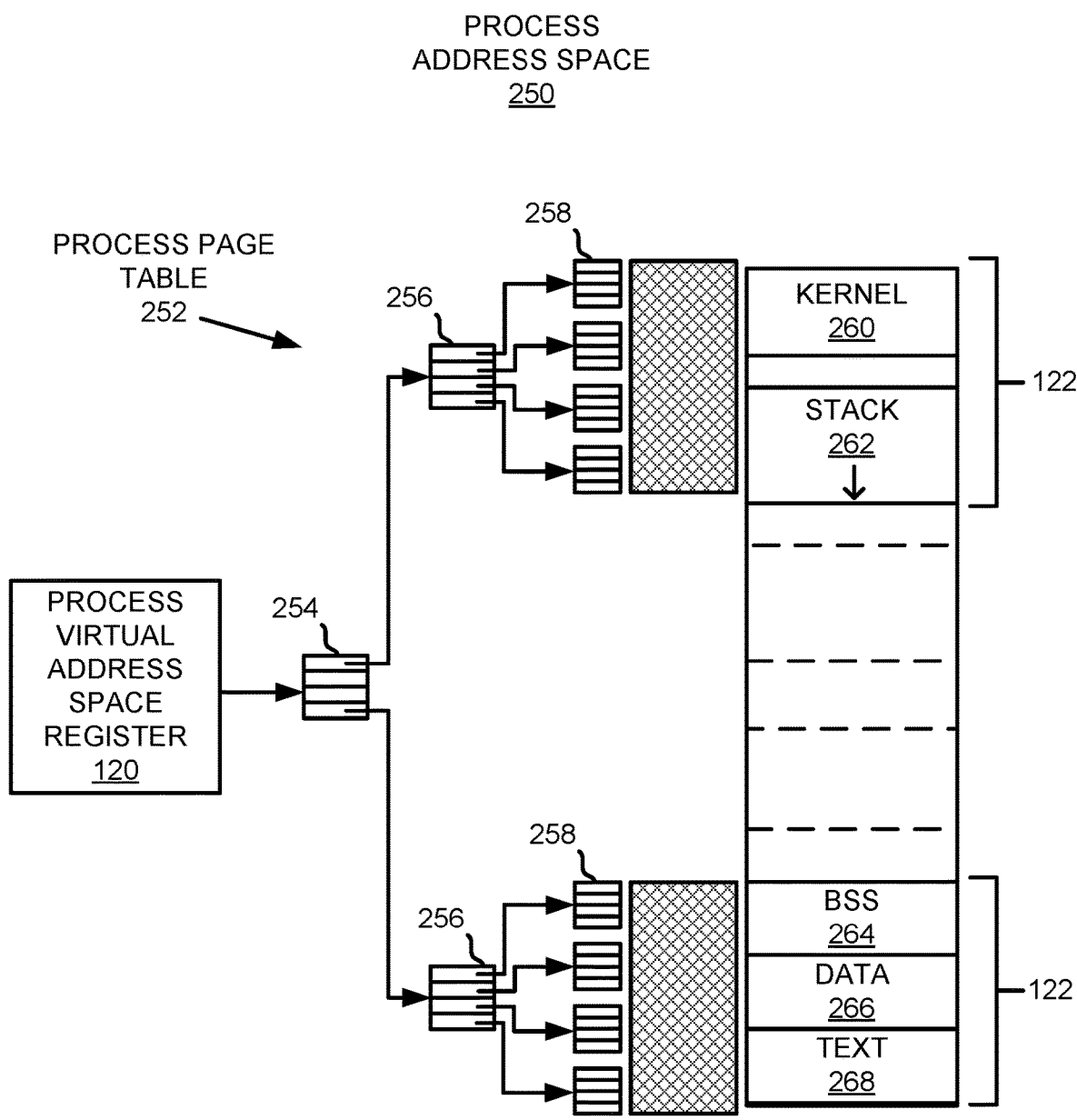
FIG. 2B depicts a block diagram of a process address space that may include the process VAS register and the second set of memory sections depicted in FIG. 1.

Reference is first made to FIGS. 1, 2A, and 2B. FIG. 1 shows a block diagram of an example apparatus 100 that may provide architectural support for programming with multiple virtual address spaces (VASes) per process. FIG. 2A depicts a block diagram of a shared address space 200 that may include the shared VAS register 110 and the first set of memory sections 112 depicted in FIG. 1. FIG. 2B depicts a block diagram of a process address space 250 that may include the process VAS register 120 (which may also be referenced herein as a private VAS register 120) and the second set of memory sections 122 depicted in FIG. 1. It should be understood that the apparatus 100 may include additional components and that some of the components described herein may be removed and/or modified without departing from a scope of the apparatus 100 disclosed herein. Likewise, it should be understood that the shared address space 200 and/or the process address space 250 may include additional components and that some of the components described herein may be removed and/or modified without departing from the scopes of the shared address space 200 and/or the process address space 250 disclosed herein.

The apparatus 100 may be a computing device, such as a server computer, a desktop computer, a laptop, a tablet, a smartphone, or the like. The apparatus 100 may include a processor 102 that may address a physical memory having memory sections 104. A memory section may be a set of ordered physical memory pages associated with some base address in virtual memory. The processor 102 may be a semiconductor-based microprocessor, a central processing unit (CPU), a graphics processing unit (GPU), an application specific integrated circuit (ASIC), a field-programmable gate array (FPGA), and/or another hardware device. Although a single processor 102 is depicted, it should be understood that the apparatus 100 may include multiple processors, multiple cores, or the like, without departing from a scope of the apparatus 100.

Although not shown, the processor 102 may be connected to a physical memory, which may include dynamic random access memory (DRAM), static random access memory (SRAM), non-volatile random access memory (NVRAM), such as memristor or phase change memory, or any other suitable form of memory. The memory may be used to store processor executable instructions and data. For instance, the physical memory may be a non-transitory computer readable medium, which may include a set of instructions, which when executed by the processor 102, may cause the processor 102 to implement various features described herein.

As shown, the processor 102 may address the memory sections 104 via a shared VAS register 110 and a process VAS register 120. Particularly, the shared virtual address space register 110 may provide translation for a first set of memory sections 112 in the memory sections 104 and the process VAS register 120 may provide translation for a second set of memory sections 122. According to examples, the shared VAS register 110 may provide translation for the first set of memory sections 112 shared between processes and the process VAS register 120 may provide translation for the second set of memory sections 122 specific to an individual process, e.g., data private to a process.

The shared VAS register 110 may be a control register (e.g., a register specified by the Instruction Set Architecture (ISA) of a processor used to alter its behavior), that may provide translation for memory sections 112 shared between processes. The memory sections 112 may be memory sections that are intended for sharing among multiple processes, such as those containing pointer data structures, shared library code, etc. The process VAS register 120 may be a control register that may provide translation for memory sections 122 that are specific to an individual process. The memory sections 122 may be memory sections that make up the context of a process, such as a code section, a section containing global variables, a stack section, etc., which may not be shared with other processes.

In operation, the processor 102 may execute a process on the apparatus 100. A process may be instructions and data that the processor 102 may execute to complete a task. For example, a database program running on the apparatus 100 may include one or more processes. A process may run under the control of an operating system and may have process state information. Although the present description refers to operating systems, it should be understood that an operating system may be any control software, including hypervisors and other supervisory software. Likewise, a process may refer to anything that exists within a VAS, including virtual machines. In any regard, a process may initially be associated with a first VAS, which the processor 102 may use to make it appear to the process that the full address space of the apparatus 100 is available to the process, even though the apparatus 100 may not be equipped with enough physical memory for the entire VAS of the process to be loaded into physical memory.

A process may desire to access a different VAS. For example, the process may need more memory than is available in the VAS. In other cases, the process may wish to access data that is contained in the VAS of a different process. Regardless of the reason, the process may wish to switch from a first VAS to a second VAS. The processor 102 may switch from the first VAS to the second VAS in various manners. For instance, the processor 102 may switch from the first VAS to the second VAS through modification of the shared VAS register 110 to point from a first translation table (e.g., a first shared page table 202) to a second translation table (e.g., a second shared page table). The processor 102 may, however, maintain the process VAS register 120 to point to the process page table 252 following the modification of the shared VAS register 110 to point to the second translation table.

It should be understood that an operating system or the processor 102 may provide an API or a new processor instruction to ensure the switch from the first VAS to the second VAS is safe. For example, the process may invoke a system call to inform the operating system of the switch in VAS. The operating system may then alter process state information in order to accurately track the VAS that is currently active for the process. In another example implementation, the processor 102 may provide a special instruction to execute the switch. For instance, the processor 102 may be provided with an identifier associated with the second VAS and the processor 102 may perform the switch in a page table roof pointer automatically, after the process state information is provided by the operating system.

Included amongst the process state information may be data that defines whether the processor 102 is to address memory sections that are specific to the process or is to address memory sections that are shared between processes. For instance, the processor 102 may receive a virtual address from the process that is to be translated to a physical address and may determine whether the virtual address corresponds to a physical address that is specific to the process or to a physical address that is shared between multiple processes. In some examples, the processor 102 may select one of the shared VAS register 110 and the process VAS register 120 based on the process state information of the process. That is, the processor 102 may select the shared VAS register 110 based on the process state information indicating that memory sections 112 that are shared between processes are to be addressed. Likewise, the processor 102 may select the process VAS register 120 based on the process the information indicating that memory sections 122 that are specific to the process are to be addressed.

As shown in FIG. 2A, the shared address space 200 may include a shared page table 202 in addition to the shared VAS register 110 and the first set of memory sections 112. The shared VAS register 110 may point to the shared page table 202. Similarly, as shown in FIG. 2B, the process address space 250 may include a process page table 252 in addition to the process VAS register 120 and the second set of memory sections 122. The process VAS register 120 may point to the process page table 252. Each of the shared address space 200 and the process address space 250 may have a defined range, e.g., from 0 to the maximum supported by the memory sections 104. The shared address space 200 and the process address space 250 may each be broken down into smaller units called pages. A page (or a frame) may be a contiguous set of memory (virtual or physical) of a specified size. For example, a page size may be 4 Kilobytes, in which, a 4 Gigabyte address space may be divided into slightly more than 1 million pages.

Each page of the shared address space 200 may be represented by a page table entry, and those combinations of the page table entries for the shared address space 200 may be referred to as a page table structure. Similarly, each page of the process address space 250 may be represented by a page table entry, and those combinations of the page table entries for the process address space 250 may be referred to as a page table structure. FIGS. 2A and 2B, respectively, depict high level views of page table structures 202, 252. Each of the page table structures (or simply page tables) 202, 252 is respectively depicted as containing a root node 204, 254, intermediate nodes 206, 256, and leaf nodes 208, 258. The leaf nodes 208, 258 may include the actual page table entries. It should be understood that the particular formats of the page table structures 202, 252 depicted in FIGS. 2A and 2B are for purposes of illustration and thus, the shared address space 200 and the process address space 250 depicted therein may have other formats without departing from the scopes of the shared address space 200 and the process address space 250.

Each page table entry may include at least two pieces of information. The first piece of information may be if the page is currently mapped to physical memory. As mentioned above, a virtual memory system may hide the fact that all of a process' VAS may not be contained in physical memory from the process. If the page is not in physical memory, the page may be stored in some other storage area (e.g., disk).

The second piece of information may be the address in physical memory storing the page (assuming the first piece of information indicates the page is stored in physical memory). It should be understood that because the physical memory may not necessarily be as large as the VAS, the virtual address may not be equivalent to the physical address. Furthermore, because a multiprocessing system executes several processes, each process may not simultaneously use the same physical memory, thus generally precluding virtual addresses from matching physical addresses.

In general, a process may wish to execute instructions or access data located at a specific virtual address. The processor 102 may receive the virtual address and access the page table structure 202, 252 pointed to by the process state information via one of the shared VAS register 110 and the process VAS register 120. The processor 102 may traverse the shared page table 202 or the process page table 252 to find the page table entry associated with the memory page containing the virtual address of interest. If the page is currently loaded into physical memory 104, the processor 102 may return the address within the physical memory 104 where the page is stored and the process may access the page in the physical memory 104. If the page is not currently in physical memory 104, a page fault occurs and control may be handed to the operating system. The operating system may then load the page from storage (e.g., disk) into the physical memory 104 (this process may involve clearing space for the page in the physical memory by selecting a page to evict from physical memory and store to disk). Once the page has been loaded into physical memory 104, the process may access the address.

As shown in FIG. 2A, the first set of memory sections 112 may include sections having a first set of addresses that may include memory-mapped files 210 and heaps 212. The memory-mapped files 210 and the heaps 212 may be shared among multiple processes and may thus be considered as corresponding to shared memory sections. As shown in FIG. 2B, the second set of memory sections 122 may include sections having a second set of addresses that may include a kernel 260, stacks 262, a BSS section 264, data 266, and text 268. The second set of memory sections 122 may be specific to a process.

The first set of memory sections 112 may be assigned a first set of address ranges and the second set of memory sections 122 may be assigned a second set of address ranges. Each of the first set of address ranges and the second set of address ranges may not be a contiguous range of addresses. In some examples, the first set of address ranges and the second set of address ranges may be architecture specific. That is, the processor 120 instruction set architecture (ISA) may specify exact virtual address ranges used for process-specific memory section translations and for shared memory section translations. Thus, the hardware may inspect the virtual address to know which translation control register 110, 120 to use to determine the associated physical mapping. By way of non-limiting example, process-specific memory sections may be translated in ranges [0x0000, 0x1000) and [0xEFFF,0xFFFF), whereas shared memory sections may be translated in the range [0x1000,0xEFFF).

In addition or in other examples, an operating system may set the first set of address ranges and the second set of address ranges. That is, the virtual address bounds between the shared memory sections 112 and the process-specific memory sections 122 may be process-specific, supported by an additional set of one or more bound control registers. The software (e.g., the operating system) may specify virtual address range bounds in the shared VAS register 110 and the process VAS register 120, which the hardware may use to identify which memory section ranges an address may belong to, and thus which page table 202, 252 to walk. A page walker may be hardware, e.g., processor 102, that traverses virtual-to-physical translation tables.

Through implementation of the apparatus 100 depicted in FIG. 1, the shared address space 200 depicted in FIG. 2A, and the process address space 250 depicted in FIG. 2B, the memory sections 122 that are specific to a process may be independent, e.g., decoupled, from the memory sections 112 that may be shared between multiple processes. That is, the memory sections 112, 122 may be decoupled through use of the shared VAS register 110 and the process VAS register 120 as disclosed herein. In one regard, process-specific memory and shared memory sections may be translated separately and such translations may be distinguished in translation caches. As a result, the translation caches, e.g., the translation lookaside buffer (TLB), may be flushed less frequently, as may be performed when VASes are switched as cached virtual to physical translations are invalidated, which may require repeated page walking. This may improve performance as losses arising from aggressive flushing of the TLB by hardware may be reduced. The apparatus 100 may provide architectural support to make programming with multiple VASes per process efficient. In addition, the apparatus 100 may include TLB support to avoid storing translations to the same physical page redundantly as well as architecture support to allow users to switch VASes in user space without a system call overhead.

Figure 3:
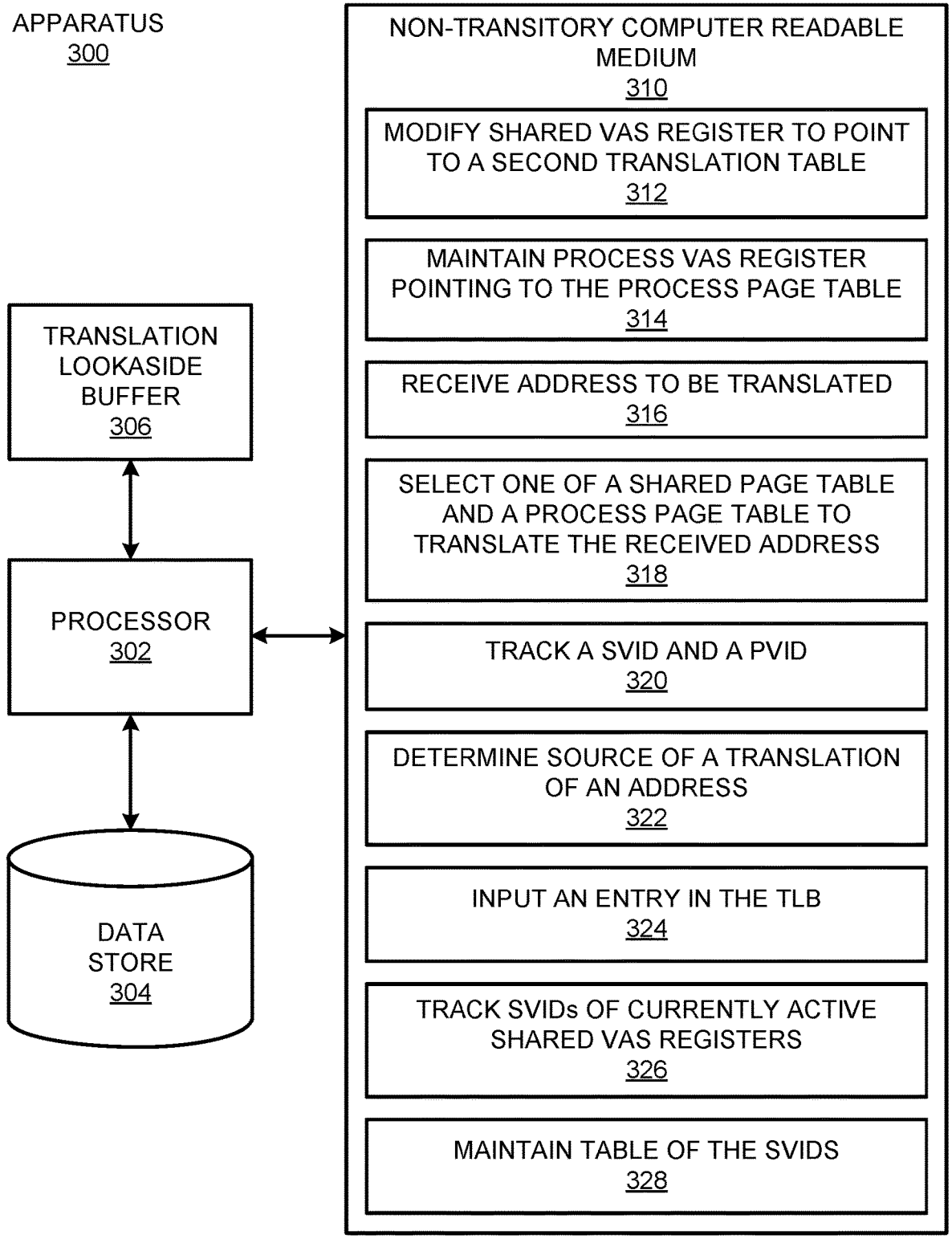
FIG. 3 shows a block diagram of an example apparatus that may provide architectural support for programming with multiple VASes per process.

Turning now to FIG. 3, there is shown a block diagram of an example apparatus 300 that may provide architectural support for programming with multiple VASes per process. It should be understood that the apparatus 300 may include additional components and that some of the components described herein may be removed and/or modified without departing from a scope of the apparatus 300 disclosed herein. The apparatus 300 may be equivalent to the apparatus 100 and thus may also include the shared VAS register 110, the process VAS register 120, the shared page table 202, the shared process page table 252, and the memory sections 104 depicted in FIGS. 1, 2A, and 2B. The description of the apparatus 300 depicted in FIG. 3 is thus made with reference to the features shown in FIGS. 1, 2A, and 2B.

The apparatus 300 may be a computing device, such as a server computer, a desktop computer, a laptop, a tablet, a smartphone, or the like. The apparatus 300 may include a processor 302 that may address a physical memory having memory sections 104. The processor 302 may be equivalent to the processor 102 and may thus be a semiconductor-based microprocessor, a central processing unit (CPU), a graphics processing unit (GPU), an application specific integrated circuit (ASIC), a field-programmable gate array (FPGA), and/or another hardware device. Although a single processor 302 is depicted, it should be understood that the apparatus 300 may include multiple processors, multiple cores, or the like, without departing from a scope of the apparatus 300.

The apparatus 300 may also include a data store 304 and a translation lookaside buffer (TLB) 306 on which the processor 302 may store or retrieve data. The data store 304 may include an electronic, magnetic, optical, or other physical storage device. In addition, although the data store 304 is depicted as being in direct communication with the processor 302, the processor 302 may instead communicate with the data store 304 via a network (not shown). The TLB 306 may be separate from the data store 304 or may be part of the data store 304.

The apparatus 300 may further include a non-transitory computer readable medium 310 that may have stored thereon machine-readable instructions that the processor 302 may execute. Examples of the machine-readable instructions are shown as 312-328 and are further discussed below. Examples of the non-transitory computer readable medium 310 may include an electronic, magnetic, optical, or other physical storage device that contains or stores executable instructions. For example, the non-transitory computer readable medium 310 may be a Random Access memory (RAM), an Electrically Erasable Programmable Read-Only Memory (EEPROM), a hard disk, an optical disc, or other type of storage device. Although the non-transitory computer readable medium 310 is depicted as including the instructions 312-328, it should be understood that some of the instructions 312-328 may be removed and/or modified without departing from a scope of the apparatus 300.

The processor 302 may fetch, decode, and execute the machine-readable instructions 312 to modify the shared VAS register 110 to point to a second translation table. For instance, the processor 302 may have initially caused the shared VAS register 110 to point to a first translation table, e.g., the shared page table 202 shown in FIG. 2, based on a translation to be performed for a process. As discussed herein, the process may, however, desire that another page table translate an address, for instance, in the event that the first translation table does not include a desired translation. In this case, the processor 302 may modify the shared VAS register 110 to point to a second translation table that includes the desired translation in order to switch the VAS of the process. The second translation table may be a second shared page table.

The processor 302 may fetch, decode, and execute the machine-readable instructions 314 to maintain the process VAS register 120 pointing to the process page table 250 for the process following modification of the shared VAS register 110 to point to the second translation table. In one regard, the processor 302 may not cause the process VAS register 120 to point to another process translation table when the shared VAS register 110 is modified to point to the second translation table because the initially accessed process page table 252 may still be used for process-specific translations for the process. By not modifying the process VAS register 120 to point to another process translation table, any translations already performed by the process VAS register 120 that are stored in the TLB 306 may not need to be flushed during or following the switch of the shared VAS.

The processor 302 may fetch, decode, and execute the machine-readable instructions 316 to receive an address to be translated. For instance, the processor 302 may receive or identify a virtual address from the process that is to be translated to a physical address.

The processor 302 may fetch, decode, and execute the machine-readable instructions 318 to select one of a shared page table 202 and a process page table 252 to translate the received address. The processor 302 may select one of the shared page table 202 and the process page table 252 based on the virtual address of the received address in any of a number of various manners. As discussed herein, the first set of memory sections 112 to which the shared page table 202 points may be assigned a first set of address ranges and the second set of memory sections 122 to which the process page table 252 points may be assigned a second set of address ranges.

In a first example in which the first set of address ranges and the second set of address ranges are architecture specific, the processor 302 may select the one of the shared page table 202 and the process page table 252 based on the first set of address ranges and the second set of address ranges within which the received address falls. In this example, the processor 120 instruction set architecture (ISA) may have specified exact virtual address ranges used for process-specific memory section translations and for shared memory section translations. In a second example in which an operating system set the first set of address ranges and the second set of address ranges, the processor 302 may select the one of the shared page table 202 and the process page table 252 based on the first set of address ranges and the second set of address ranges within which the received address falls. In this example, an operating system, e.g., software, may have specified the virtual address range bounds in the shared VAS register 110 and the process VAS register 120.

In a further example, the processor 302 may select both the shared page table 202 and the process page table 252. In this example, the processor 302 may walk both the shared page table 202 and the process page table 252, e.g., concurrently, to determine whether the shared page table 202 or the process page table 252 includes the virtual address to physical address translation for the received address. The processor 302 may select both the shared page table 202 and the process page table 252 in instances in which there is no explicit separation of translation ranges specified in a hardware state. If neither the shared page table 202 nor the process page table 252 contains a translation, then the translation is considered not found. If one page table 202, 252 returns a translation, the address is found in the memory sections 112, 122 of that page walker. If both page tables 202, 252 return a translation, then the page tables 202, 252 may be considered as being in an inconsistent state because the shared memory sections 112 and process-specific memory sections 122 should not overlap. The processor 302 in this case may throw an exception.

The processor 302 may fetch, decode, and execute the machine-readable instructions 320 to track a shared VAS identifier (SVID) 402 of a currently active shared VAS register 110 and a process VAS identifier (PVID) 404 of a currently active process VAS register 120. The SVID 402 and the PVID 404 are depicted in FIG. 4, which shows a diagram of an example TLB 400 in which SVID 402 and the PVID 404 of a currently active shared VAS register 110 and a currently active process VAS register 120 may be tracked.

Figure 4:
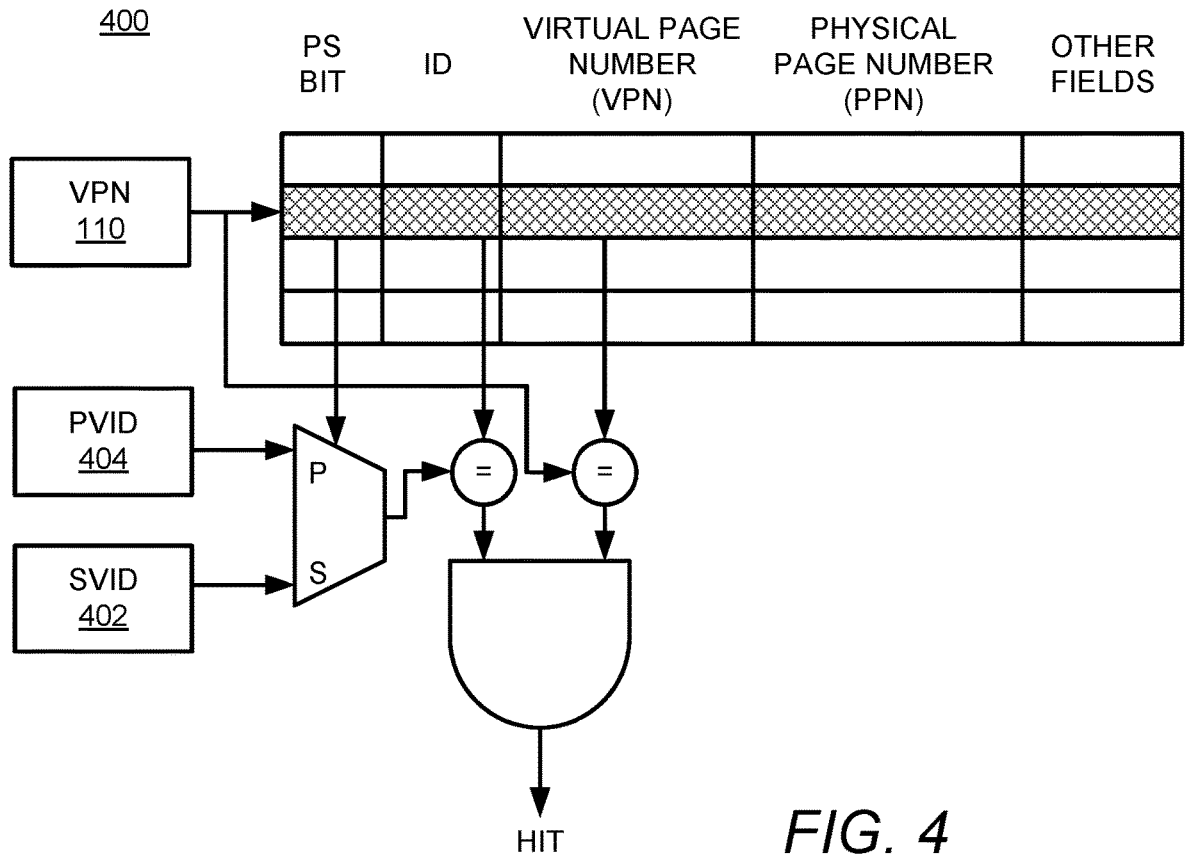
FIG. 4 depicts a diagram of a TLB in which a shared VAS identifier and a process VAS identifier be tracked.

As shown in FIG. 4, the TLB 400 may store a PS bit, which may be a bit in the TLB 400 that may be set to one of two values, S(0) or P(1), which may indicate that the identifier (ID) in the TLB 400 is a SVID or a PVID, respectively. Generally speaking, the processor 302 may execute the instructions 320 to avoid storing translations to the same physical page redundantly. The instructions 320 may also be a modification to a tagged TLB design in which TLB entries are tagged with process identifiers to avoid flushing the TLB entries at context switches between processes. The processor 302 may separately track the SVID 402 of the currently active shared VAS register 110, and a PVID 404 for the currently active process, associated with a process VAS register 120 context. If a translation is obtained from the process page table 252, the PVID 404 may be stored as the ID in the TLB 400 and the PS bit may be set to P. If a translation is obtained from the shared page table 202 (thus belonging to the memory sections 112 translated by the shared VAS register 110), the SVID 402 is stored as the ID in the TLB and the PS bit is set to S. On a lookup, the PS bit may decide whether to compare the translation to the currently active PVID 404 or SVID 402.

When a process switches its address space, the SVID and shared VAS register 110 may be changed but the PVID and the process VAS register 120 may remain the same. Thus, if the process accesses its process-specific memory sections 122 while switched to an alternate shared VAS register 110 context, the process may reuse the cached translations as the translations may be marked with the PVID, independent of which shared VAS register 110 the process was using at the time. Similarly, if a process accesses shared VAS register 110 translated memory sections 112 and caches these translations, then upon a context switch to a new process using the same shared VAS register 110 context, the new process may reuse cached translations of the shared memory sections cached by the old process because the translations are marked with the ID of the SVID, independent of which process accessed it.

Figure 5:
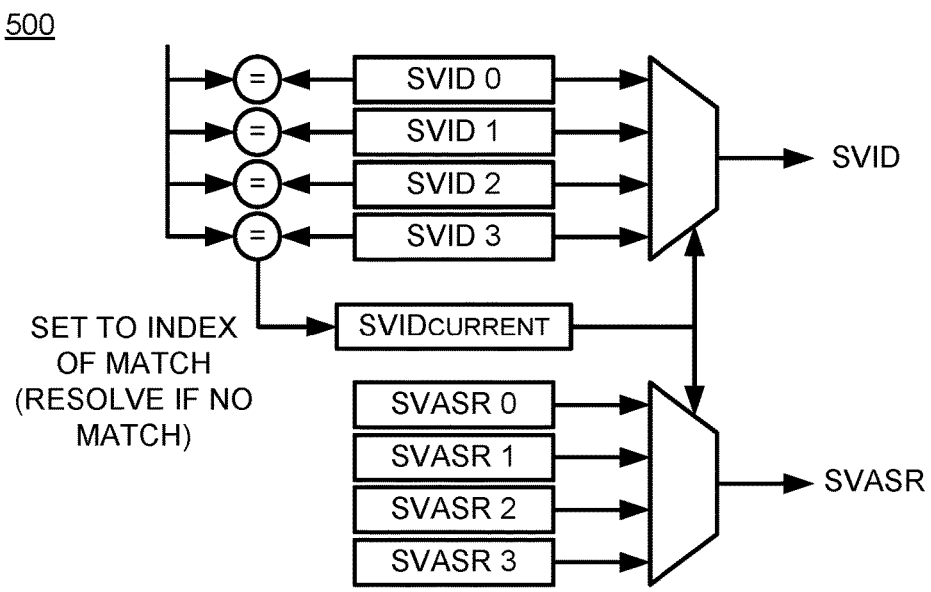
FIG. 5 shows an example diagram of a hardware support to modify a shared VAS register context from user space.

According to examples, architecture modifications may have been made to enable implementation of the instructions 320, which may allow a process to safely modify its SVID and shared VAS register 110 state in user space without invoking a system call, as shown in FIG. 5. FIG. 5 shows an example diagram 500 of a hardware support to modify the shared VAS register 110 context from user space. The ISA may be extended to provide an additional non-privileged hardware instruction that may be invoked from user space to switch the shared VAS register (SVASR) context, providing an SVID operand.

The processor 302 may fetch, decode, and execute the machine-readable instructions 322 to determine a source of a translation of an address. That is, the processor 302 may determine whether a translation of an address was obtained from a page table 202 pointed to by the shared VAS register 110 or a page table 252 pointed to by the process VAS register 120. In addition, the processor 302 may fetch, decode, and execute the machine-readable instructions 324 to input an entry in the TLB 400 corresponding to one of the SVID and the PVID for the translated address based on the determination of whether the translation of an address was obtained from a page table pointed to by the shared VAS register 110 or a page table pointed to by the process VAS register 120.

The processor 302 may fetch, decode, and execute the machine-readable instructions 326 to track SVIDs of currently active shared VAS registers 110. For instance, the processor 302 may track the SVIDs of the currently active shared VAS registers 110 in the TLB 400 as discussed above.

The processor 302 may fetch, decode, and execute the machine-readable instructions 328 to maintain a table of the SVIDs of the shared virtual spaces to which the individual process is allowed to switch. That is, the processor 302 may maintain a table of shared VAS register contexts to which a process thread may be allowed to switch. In some implementations, a set of registers that are initialized by the software on a context switch may implement the table. In other implementations, the table may be implemented as a cache-like structure that is tagged with the PVID. In both of these implementations, overflow may be handled by spilling to a special memory location.

In instances in which the SVID that a user is requesting is present in the table, the switch may be made without kernel intervention. In these instances, switching of the VAS may be performed while avoiding switching to the kernel mode. However, in instances in which the requested SVID is not present in the table, the hardware may resolve the situation by, for instance, throwing an exception to the operating system, which signals that the requested SVID is not valid. When a process detaches a VAS, the process no longer has permission to use the associated shared VAS register 110 context. As a result, the operating system may invalidate the table entries corresponding to that process and VAS.

Figure 6:
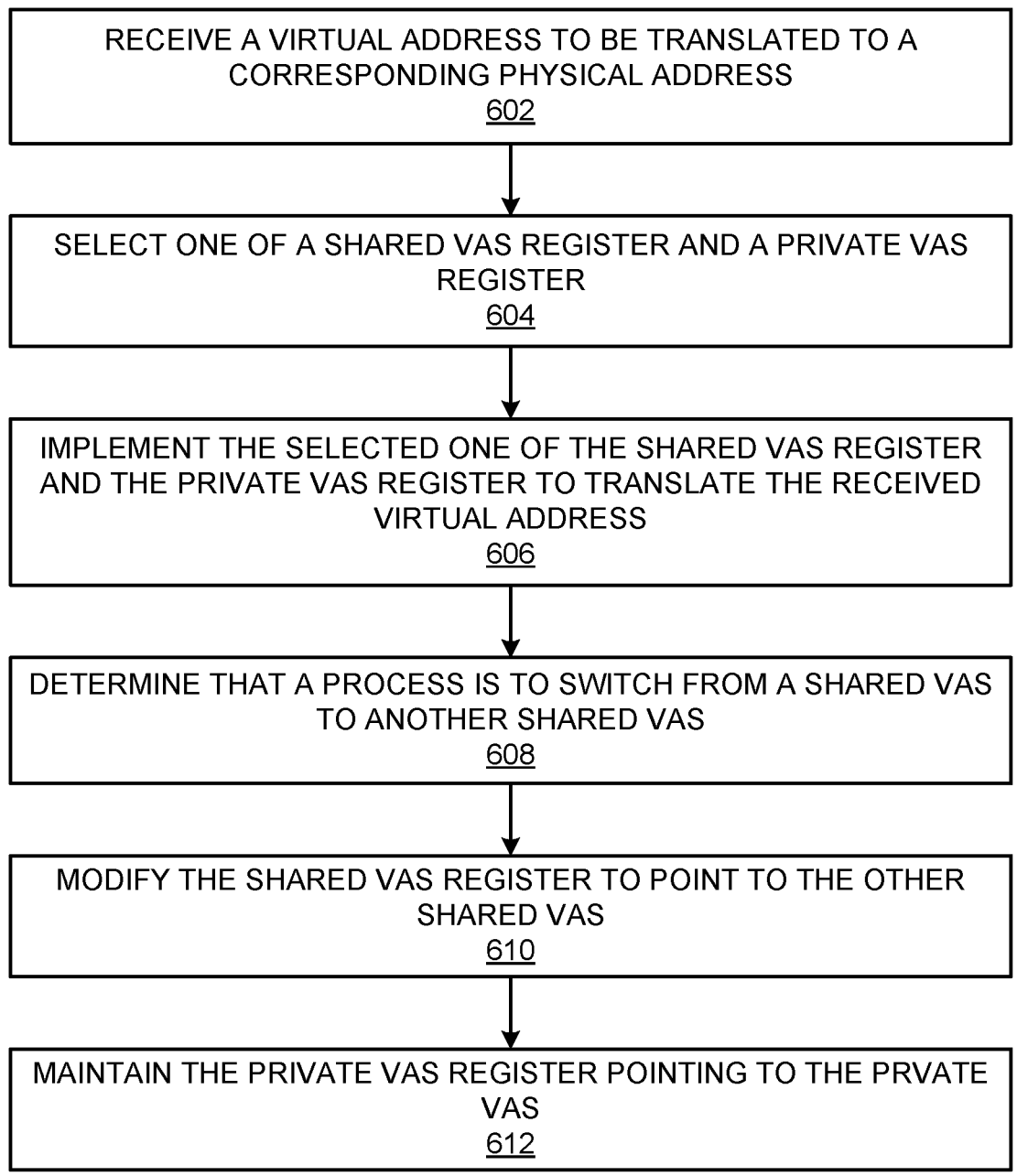
FIG. 6 shows a flow diagram of an example method for implementing a shared VAS register and a private VAS register to translate virtual addresses to physical addresses.
Figure 7:
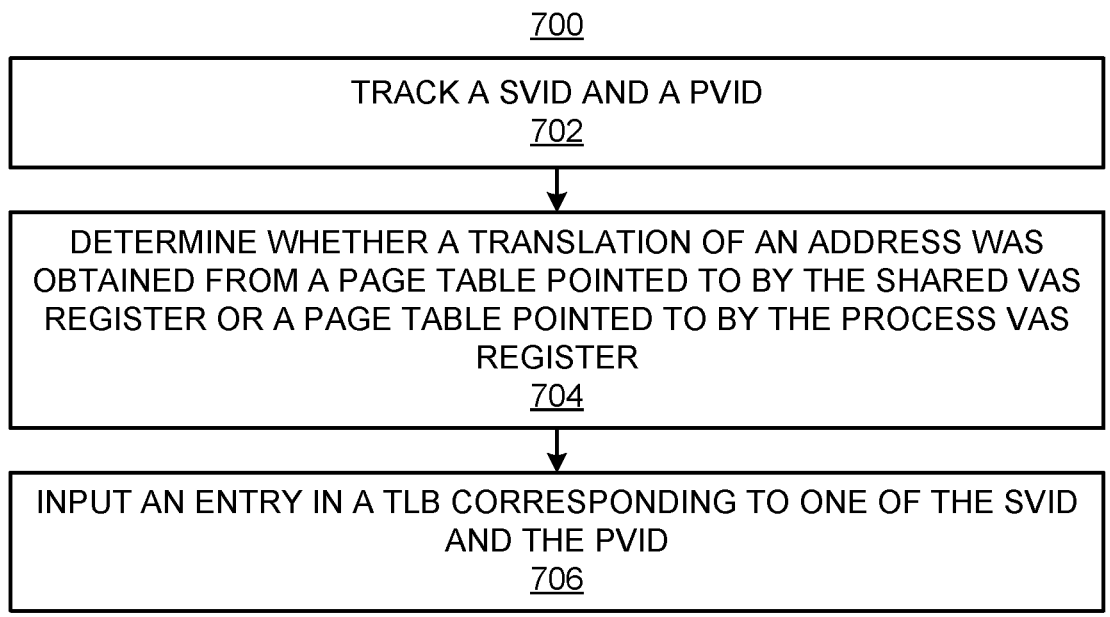
FIG. 7 shows a flow diagram of an example method for tracking and maintaining SVIDs and PVIDs in a TLB.
Figure 8:
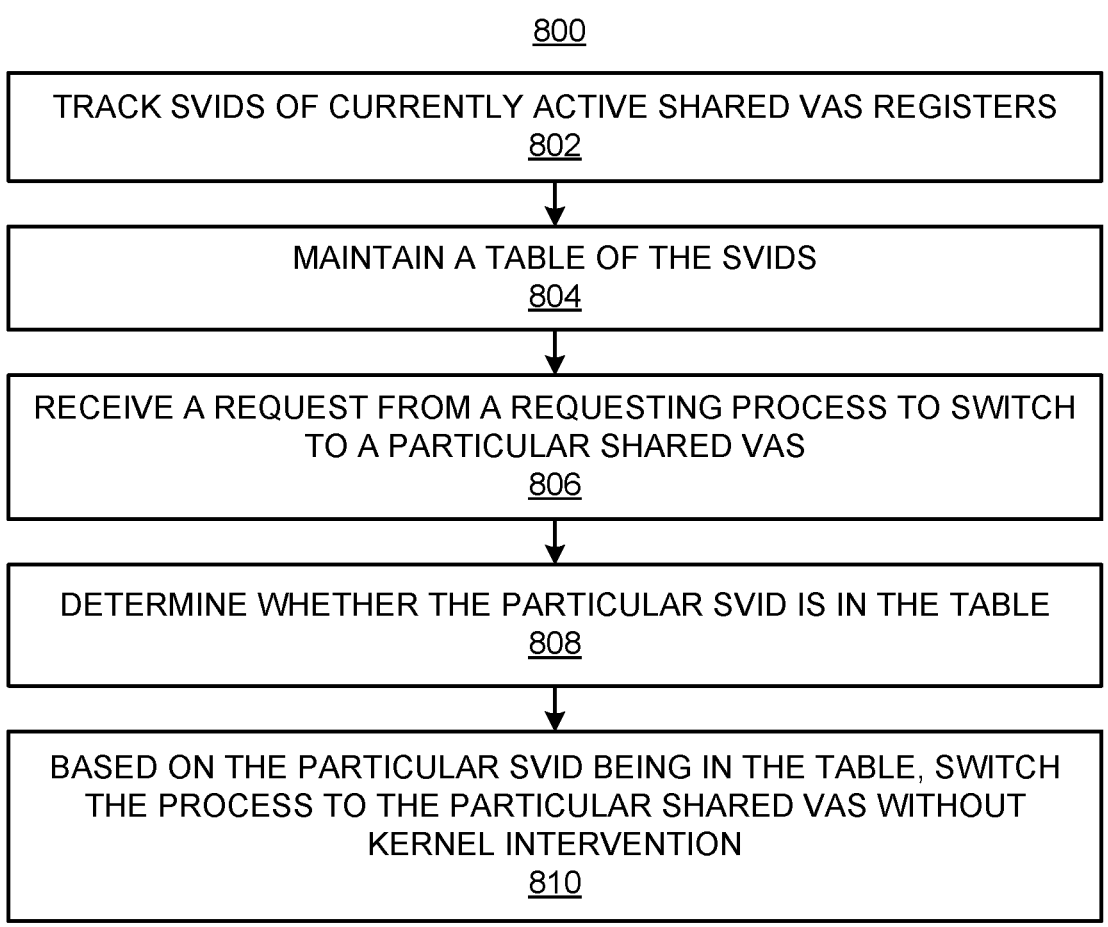
FIG. 8 shows a flow diagram of an example method for tracking SVIDs of currently active shared VAS registers and using a table of the tracked SVIDs to enable switching between shared VASes without kernel intervention.

Turning now to FIG. 6, there is shown a flow diagram of an example method 600 for implementing a shared VAS register 110 and a private VAS register 120 to translate virtual addresses to physical addresses. In addition, FIG. 7 shows a flow diagram of an example method 700 for tracking and maintaining SVIDs and PVIDs in a TLB and FIG. 8 shows a flow diagram of an example method 800 for tracking SVIDs of currently active shared VAS registers 110 and using a table of the tracked SVIDs to enable switching between shared VASes without kernel intervention. It should be understood that the methods 600-800 depicted in FIGS. 6-8 may include additional operations and that some of the operations described therein may be removed and/or modified without departing from scopes of the methods 600-800. The descriptions of the methods 600-800 are also made with reference to the features depicted in FIGS. 1-5 for purposes of illustration. Particularly, the processor 102, 302 may execute some or all of the operations included in the methods 600-800.

With reference first to FIG. 6, at block 602, the processor 102, 302 may receive a virtual address to be translated to a corresponding physical address. For instance, the processor 102, 302 may receive or identify a virtual address from a process that is to be translated to a physical address.

At block 604, the processor 102, 302 may select one of a shared VAS register 110 that points to a shared VAS and a private VAS register 120 that points to a private VAS to translate the received virtual address to the corresponding physical address. As discussed herein, the shared VAS may correspond to a first set of memory sections and the private VAS may correspond to a second set of memory sections. In addition, the processor 102, 302 may select one of the shared VAS register 110 and the private VAS register 120 in any of the manners discussed herein with respect to the apparatus 300 in FIG. 3.

At block 606, the processor 102, 302 may implement the selected one of the shared VAS register 110 and the private VAS register 120 to translate the received virtual address to the corresponding physical address.

At block 608, the processor 102, 302 may determine that a process executing on the processor 102, 302 is to switch from the shared VAS to another shared VAS. The process may desire to access a different VAS, for instance, when the process may need more memory than is available in the shared VAS, when the process is to access data that is contained in the VAS of a different process, or the like.

At block 610, the processor 102, 302 may modify the shared VAS register 110 to point to the other shared VAS to switch the process to the other shared VAS. The processor 102, 302 may switch from the first VAS to the second VAS in various manners. For instance, the processor 102, 302 may switch from the shared VAS, e.g., the first VAS, to the other VAS, e.g., the second VAS, through modification of the shared VAS register 110 to point from a first translation table (e.g., a first shared page table 202) to a second translation table (e.g., a second shared page table).

At block 612, the processor 102, 302 may maintain the process VAS register 120 to point to the process page table 252 following the modification of the shared VAS register 110 to point to the second translation table. As the processor 102, 302 may decouple the process page table 252 from the shared page table 202, translations of the process-specific memory sections 122 and the shared memory sections 112 may be distinguished from each other in translation caches. As a result, the translation caches, e.g., the translation lookaside buffer (TLB), may avoid redundantly storing process-specific translations for shared sections.

Turning now to FIG. 7, at block 702, the processor 102, 302 may track a shared VAS identifier (SVID) of a currently active shared VAS register 110 and a private VAS identifier (PVID) of a currently active private VAS register 120. The processor 102, 302 may track the SVID and the PVID in a TLB as discussed with respect to FIG. 4.

At block 704, the processor 102, 302 may determine whether a translation of an address was obtained from a page table pointed to by the shared VAS register 110 or a page table pointed to by the private VAS register 120.

At block 706, the processor 102, 302 may input an entry in a TLB 400 corresponding to one of the SVID and the PVID for the translated address based on the determination of whether the translation of an address was obtained from the shared VAS register 110 or the private VAS register 120.

Turning now to FIG. 8, at block 802, the processor 102, 302 may track SVIDs of currently active shared VAS registers 110. For instance, the processor 102, 302 may track the SVIDs of the currently active shared VAS registers 110 in the TLB 400 as discussed above. At block 804, the processor 102, 302 may maintain a table of the SVIDs of the shared virtual spaces to which the individual process is allowed to switch. At block 806, the processor 102, 302 may receive a request from a requesting process to switch to a particular shared VAS, in which the particular shared VAS may be assigned a particular SVID. At block 808, the processor 102, 302 may determine whether the particular SVID is in the table of the SVIDs. At block 810, the processor 102, 302 may, based on a determination that the particular SVID is in the table of SVIDs, switch the requesting process to the particular shared VAS space without kernel intervention.

Some or all of the operations set forth in the methods 600-800 may be contained as utilities, programs, or subprograms, in any desired computer accessible medium. In addition, the methods 600-800 may be embodied by computer programs, which may exist in a variety of forms. For example, the methods 600-800 may exist as machine readable instructions, including source code, object code, executable code or other formats. Any of the above may be embodied on a non-transitory computer readable storage medium.

Examples of non-transitory computer readable storage media include computer system RAM, ROM, EPROM, EEPROM, and magnetic or optical disks or tapes. It is therefore to be understood that any electronic device capable of executing the above-described functions may perform those functions enumerated above.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration only and are not meant as limitations. Many variations are possible within the spirit and scope of the disclosure, which is intended to be defined by the following claims—and their equivalents—in which all terms are meant in their broadest reasonable sense unless otherwise indicated.

What is claimed is:

1. An apparatus comprising:
    a processor to address a physical memory having memory sections, wherein a first set of memory sections is shared between processes and a second set of memory sections is specific to an individual process;
    a shared virtual address space register to provide translation for the first set of memory sections shared between processes;
    a process virtual address space register to provide translation for the second set of memory sections specific to the individual process, the translation for the second set of memory sections being independent from the translation for the first set of memory sections; and
a translation lookaside buffer,
wherein the processor is to:
  track a shared virtual address space identifier (SVID) of a currently active shared virtual address space register and a process virtual address space identifier (PVID) of a currently active process virtual address space register;
  determine whether a translation of an address was obtained from a page table pointed to by the shared virtual address space register or a page table pointed to by the process virtual address space register; and
  input an entry in the translation lookaside buffer corresponding to one of the SVID and the PVID for the translated address based on the determination of whether the translation of an address was obtained from the page table pointed to by the shared virtual address space register or the page table pointed to by the process virtual address space register.

2. The apparatus of claim 1, wherein the shared virtual address space register points to a first translation table, and wherein the processor is to switch a virtual address space of the individual process through modification of the shared virtual address space register to point to a second translation table.

3. The apparatus of claim 2, wherein the process virtual address space register points to a process page table and wherein the processor is to maintain the process virtual address space register pointing to the process page table following modification of the shared virtual address space register to point to the second translation table.

4. The apparatus of claim 1, wherein the processor is to receive an address on which a virtual address to physical address translation is to be implemented and wherein the processor is to select one of a shared page table pointed to by the shared virtual address space register and a process page table pointed to by the process virtual address space register to translate the received address.

5. The apparatus of claim 4, wherein the first set of memory sections is assigned a first set of address ranges and the second set of memory sections is assigned a second set of address ranges, wherein the first set of address ranges and the second set of address ranges are architecture specific, and wherein the processor to is select one of the shared page table and the process page table based on the first set of address ranges and the second set of address ranges within which the received address falls.

6. The apparatus of claim 4, wherein the first set of memory sections is assigned a first set of address ranges and the second set of memory sections is assigned a second set of address ranges, wherein the first set of address ranges and the second set of address ranges are set by an operating system, and wherein the processor is to select one of the shared page table and the process page table based on the first set of address ranges and the second set of address ranges within which the received address falls.

7. The apparatus of claim 4, wherein the processor is to walk both the shared page table and the process page table to determine whether the shared page table or the process page table includes a virtual address to physical address translation for the received address.

8. The apparatus of claim 1, wherein the processor is to:
  track shared virtual address space identifiers (SVIDs) of currently active shared virtual address space registers; and
  maintain a table of the SVIDs of the shared virtual spaces to which the individual process is allowed to switch.

9. A method comprising:
  receiving, by a processor, a virtual address to be translated to a corresponding physical address;
  selecting, by the processor, one of a shared virtual address space register that points to a shared virtual address space and a private virtual address space register that points to a private virtual address space to translate the received virtual address to the corresponding physical address, wherein the shared virtual address space corresponds to a first set of memory sections and the private virtual address space corresponds to a second set of memory sections;
  implementing, by the processor, the selected one of the shared virtual address space register and the private virtual address space register to translate the received virtual address to the corresponding physical address;
  tracking a shared virtual address space identifier (SVID) of a currently active shared virtual address space register and a private virtual address space identifier (PVID) of a currently active private virtual address space register;
  determining whether a translation of an address was obtained from a page table pointed to by the shared virtual address space register or a page table pointed to by the private virtual address space register; and
  inputting an entry in a translation lookaside buffer corresponding to one of the SVID and the PVID for the translated address based on the determination of whether the translation of an address was obtained from the page table pointed to by the shared virtual address space register or the page table pointed to by the private virtual address space register.

10. The method of claim 9, further comprising:
  determining that a process executing on the processor is to switch from the shared virtual address space to another shared virtual address space;
  modifying the shared virtual address space register to point to the other shared virtual address space to switch the process to the other shared virtual address space; and
  maintaining the private virtual address space register pointing to the private virtual address space.

11. The method of claim 9, wherein the first set of memory sections is assigned a first set of address ranges and the second set of memory sections is assigned a second set of address ranges, and wherein to select one of the shared virtual address space and the private virtual address space to translate the received address, the method further comprises:
  determining within which of the first set of address ranges and the second set of address ranges the received address falls; and
  wherein selecting one of the shared virtual address space register and the private virtual address space register further comprises selecting the shared virtual address space or the private virtual address space based on the determination of which of the first set of address ranges and the second set of address ranges the received address falls within.

12. The method of claim 9, wherein the shared virtual address space corresponds to a first page table and the private virtual address space corresponds to a second page table, and wherein selecting one of the shared virtual address space register and the private virtual address space register further comprises:

walking both the first page table and the second page table to determine whether either or both of the first page table and the second page table includes a virtual address to physical address translation for the received address.

13. The method of claim 12, further comprising:

based on a determination that neither the first page table nor the second page table includes the translation, determining that no translation has been found;

based on a determination that one of the first page table or the second page table includes the translation, determining that the received address is found in the sections of one of the first page table or the second page table; and based on a determination that both the first page table and the second page table include the translation, determining that the first page table and the second page table are in an inconsistent state.

14. The method of claim 9, further comprising:

tracking shared virtual address space identifiers (SVID) of currently active shared virtual address space registers; and maintaining a table of the SVIDs of the shared virtual spaces to which the individual process is allowed to switch.

15. The method of claim 14, further comprising:

receiving a request from a requesting process to switch to a particular shared virtual address space, the particular shared virtual address space being assigned a particular SVID;

determining whether the particular SVID is in the table of SVIDs; and based on a determination that the particular SVID is in the table of SVIDs, switching the requesting process to the particular shared virtual address space without kernel intervention.

16. A non-transitory computer readable medium on which are stored machine readable instructions that when executed by a processor cause the processor to:

receive a virtual address to be translated to a corresponding physical address in a physical memory;

select one of a shared virtual address space register that points to a shared virtual address space and a private virtual address space register that points to a private virtual address space to translate the received virtual address to the corresponding physical address, wherein the shared virtual address space corresponds to a first set of memory sections and the private virtual address space corresponds to a second set of memory sections;

implement the selected one of the shared virtual address space register and the private virtual address space register to translate the received virtual address to the corresponding physical address;

track a shared virtual address space identifier (SVID) of a currently active shared virtual address space register and a private virtual address space identifier (PVID) of a currently active private virtual address space register;

determine whether a translation of an address was obtained from a page table pointed to by the shared virtual address space register or a page table pointed to by the private virtual address space register; and input an entry in a translation lookaside buffer corresponding to one of the SVID and the PVID for the translated address based on the determination of whether the translation of an address was obtained from the page table pointed to by the shared virtual address space register or the page table pointed to by the private virtual address space register.

17. The non-transitory computer readable medium of claim 16, wherein the instructions are further to cause the processor to:

track shared virtual address space identifiers (SVID) of currently active shared virtual address space registers;

maintain a table of the SVIDs of the shared virtual spaces to which the individual process is allowed to switch;

receive a request from a requesting process to switch to a particular shared virtual address space, the particular shared virtual address space being assigned a particular SVID;

determine whether the particular SVID is in the table of SVIDs; and based on a determination that the particular SVID is in the table of SVIDs, switch the requesting process to the particular shared virtual address space without kernel intervention.

* * * * *